United States Patent [19]

Thoone et al.

[11] Patent Number: 4,495,412

[45] Date of Patent: Jan. 22, 1985

[54] DEVICE FOR THE OPTICAL SCANNING OF A DOCUMENT

[75] Inventors: Martinus L. G. Thoone; Giok D. Khoe, both of Eindhoven, Netherlands; Dieter Küppers, Aachen, Fed. Rep. of Germany; Pol A. G. J. Gustin, Brussels, Belgium

[73] Assignee: U.S. Philips Corporation, New York, N.Y.

[21] Appl. No.: 402,509

[22] Filed: Jul. 28, 1982

[30] Foreign Application Priority Data

Jul. 30, 1981 [NL] Netherlands ............... 8103599

[51] Int. Cl.³ ............... G02B 5/14; G06K 7/10
[52] U.S. Cl. ............... 250/227; 350/96.1; 358/200
[58] Field of Search ............... 250/227, 234, 235; 350/96.1; 358/293, 200, 212, 213, 294; 235/472, 473

[56] References Cited

U.S. PATENT DOCUMENTS

| 3,663,083 | 5/1972 | Friedman et al. | 350/96.1 |
| 4,010,364 | 3/1977 | Fuwa | 358/200 X |
| 4,233,506 | 11/1980 | Yamamoto et al. | 250/227 |
| 4,287,414 | 9/1981 | Soo et al. | 250/227 |

*Primary Examiner*—Edward P. Westin
*Attorney, Agent, or Firm*—Robert T. Mayer; Algy Tamoshunas

[57] ABSTRACT

The device comprises a transducer (3) comprising a row of photoelectric elements (27), and a coupling member (7) with an entrance (11) which is to be directed towards the document (1) and an exit (13) which is coupled to the transducer. The coupling member is constructed as an integrated optical waveguide circuit comprising a glass substrate (17) in which there are provided grooves (19) which, in order to form optical conductors (21), are filled with a glass having a refractive index which is higher than that of the glass of the substrate. The width of each groove gradually decreases from the entrance of the coupling member towards the exit and over the entire length of the grooves the distance between every two adjacent grooves is substantially constant and substantially smaller than the width of the grooves, so that substantially all light originating from a scanned line of the document is supplied to the transducer.

4 Claims, 6 Drawing Figures

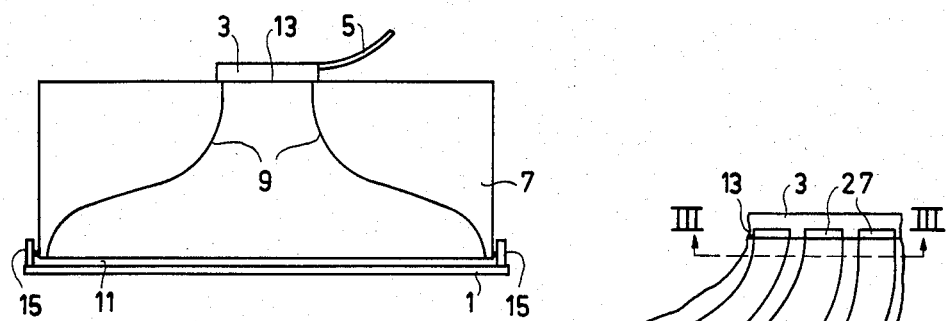
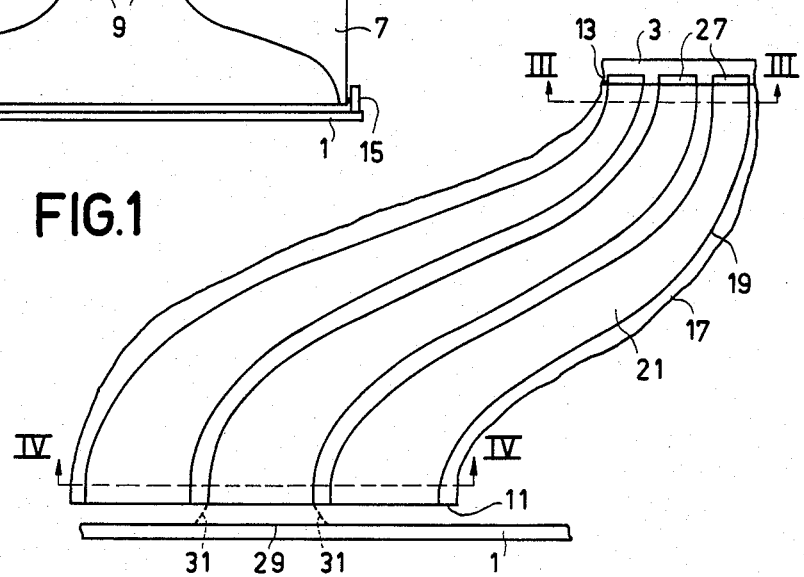
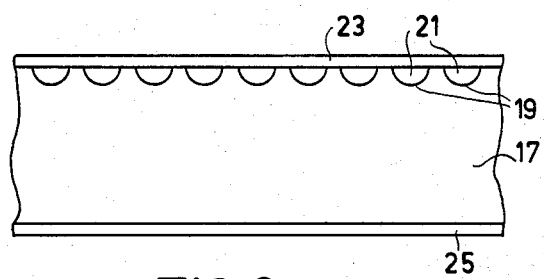
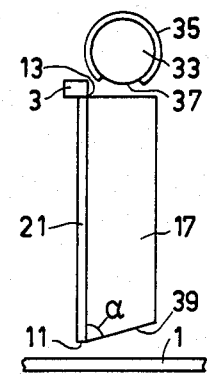
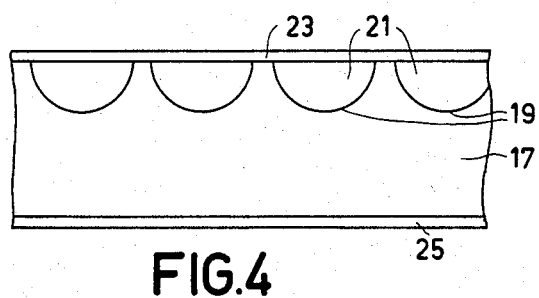
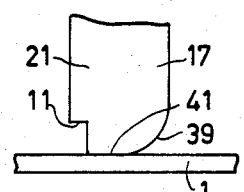

DEVICE FOR THE OPTICAL SCANNING OF A DOCUMENT

The invention relates to a device for the optical scanning of a document, comprising a transducer which comprises a row of photoelectric elements and a coupling member with an entrance which is to be directed towards the document and an exit which is optically connected to the transducer, said coupling member being constructed as an integrated optical waveguide circuit comprising a glass substrate in which there are formed optical conductors which extend from the entrance to the exit and the ends of which are situated on a first line at the entrance and on a second line at the exit, said first line being substantially longer than the second line, the width of each optical conductor gradually decreasing from the entrance of the coupling member towards the exit.

A device of this kind is known from IBM Technical Disclosure Bulletin, Vol. 17, No. 6 (November 1974), pp. 1821-1822. When the entrance of the coupling member is directed towards an illuminated document, for example, a sheet of paper with writing on it, each optical conductor receives a quantity of light which is dependent on the brightness of the document at the area of the end of the optical conductor. The photoelectric element coupled to the relevant optical conductor converts the light into an electrical signal whose value, consequently, also depends on the local brightness of the document. When each optical conductor is coupled to one photoelectric element, information present on the document is thus converted into electrical signals, each signal representing the information of one image point, the number of image points being equal to the number of light conductors. All image points are situated on a line (the scanned line) which is parallel to the line on which the ends of the light conductors are situated at the entrance of the coupling member. By movement of the device perpendicularly to the direction of the scanned line, the entire document can be scanned and all information present on the document can be converted into electrical signals. These signals can be stored in a memory for later use or can be supplied directly to a remote receiver in order to make a copy of the document.

Contemporary techniques for the manufacture of micro-electronic components permit the manufacture of very small transducers comprising a very large number of photoelectric elements. For example, a transducer comprising 1,728 elements can have a length of less than 30 mm. The width of a sheet of paper is approximately 21 cm and the centre-to-centre distance of the light conductor must therefore be substantially larger (for example, 10×larger) at the area of the entrance than at the area of the exit in order to enable the length of a scanned line on the document to be compressed to the length of the transducer. In the known device, the light conductors are formed by locally covering the substrate with a metal, followed by ion bombardment. The centre-to-centre distance of the optical conductors is only approximately 10% larger at the entrance than at the exit. Nevertheless, the sum of the widths of all the light conductors amounts to only half the length of a scanned line of the document and consequently the transducer receives only a comparatively small part of the light originating from the revelent line.

It is an object of the invention to provide a device of the kind set forth in which the light of substantially the entire scanned line is supplied to the transducer, whilst the centre-to-centre distance of the optical conductors at the area of the entrance amounts to a multiple of that at the area of the exit. To this end, the device in accordance with the invention is characterized in that in the glass substrate of the coupling member there are provided grooves which are filled with a glass having a refractive index higher than that of the glass of the substrate in order to form the light conductors, over the entire length of the grooves the distance between every two adjacent grooves being substantially constant and substantially smaller than the width of the grooves.

The manufacture of integrated optical waveguide circuits is known per se from, for example, Japanese Kokai No. 53,70839, an abstract in the English language of which has appeared in Patent Abstracts of Japan, Vol. 2 pages 5556E-78 (1978). A further method of manufacturing such circuits is proposed in the Applicants' prior Netherlands patent application No. 8006410, corresponding to U.S. Pat. No. 3,318,966. This method permits the manufacture of light conductors of varying width by a corresponding variation of the width of the grooves.

It is also possible to provide the device in accordance with the invention with an efficient and simple facility for the illumination of the document. To this end, an embodiment of the device is characterized in that the thickness of the substrate is substantially larger than the depth of the grooves, and near the transducer there is arranged a linear light source which is parallel to the row of photo-electric elements and which is so arranged with respect to the substrate that at least a part of the light emitted by the light source enters the substrate near the exit of the coupling member and leaves the substrate near the entrance of the coupling member in order to illuminate the document to be scanned.

Embodiments of the invention will be described in detail hereinafter with reference to the drawings, in which:

FIG. 1 is a front view of an embodiment of a device in accordance with the invention;

FIG. 2 shows, on an enlarged scale, a detail of the device shown in FIG. 1;

FIG. 3 is a cross-sectional view taken along the line III—III in FIG. 2;

FIG. 4 is a cross-sectional view taken along the line IV—IV in FIG. 2;

FIG. 5 is a side elevation of a second embodiment of a device in accordance with the invention; and FIG. 6 is a side elevation of a detail of a third embodiment.

The device for the optical scanning of a document 1 which is shown diagrammatically in FIG. 1 comprises a transducer 3 which comprises a row of photoelectric elements (not visible in FIG. 1) which extends from left to right. The photoelectric elements are capable of converting light signals into electrical signals which are applied to a signal processing device (not shown), for example, a transmitting for facsimile, via a cable 5 which is connected to the transducer 3.

The transducer 3 receives light from the document 1 via a coupling member 7 which comprises a number of optical conductors which extend in a zone which is bounded by curved lines 9 between an entrance 11 which faces the document and an exit 13 of the coupling member which is optically coupled to the transducer 3.

The optical conductors are not individually shown in FIG. 1. At the entrance 11 their ends are situated on a first line which extends from left to right, and at the exit 13 they are arranged on a second line which is parallel to the first line. Because the boundaries 9 of the zone in which the optical conductors extend are situated substantially further apart at the entrance 11 than at the exit 13, the first line is substantially longer than the second line. The length of the first line corresponds, for example, to the width of a document of the format A4 (approximately 21 cm) and that of the second line to the length of the transducer 3 (for example, approximately 3 cm).

By means of the above-described construction of the device, substantially all the light originating from a line of the document 1 is supplied to the transducer 3 and is converted into electrical signals. In order to convert all the information present on the entire document into electrical signals, the device must be displaced perpendicularly to the plane of the drawing from top to bottom of the document. To this end, the document may be arranged, for example, on a transport device (not shown). Another possibility is to provide the device with rolling means which comprise, for example, two wheels 15 which are arranged on both sides of the coupling member 7 and which are rigidly interconnected by means of a shaft so that the device can be rolled over the document by hand, the distance between the entrance 11 and the document being maintained constant by the wheels. In order to indicate the location of the scanned lines on the document 1, the rolling means may also comprise a pulse generator which supplies pulses to the signal processing device in accordance with the distance travelled by the wheels 15. Pulse generators of this kind are known per se and a description of such a generator is not necessary for a proper understanding of the invention.

The FIGS. 2 to 4 are more detailed representations of the construction of the coupling member 7. The coupling member is constructed as an integrated optical waveguide circuit, for example, by means of a method as described in said Japanese Kokai No. 53,70839 or in said prior Netherlands patent application No. 8006410 (PHN 9897). To this end, a glass substrate 17 is provided with grooves 19 which are subsequently filled with glass having a refractive index higher than that of the glass of the substrate in order to form the optical conductors 21. The glass used to fill the grooves 19 may consist of a number of successively deposited layers with a continuously increasing refractive index (the optical conductors 21 are then of the so-called "graded index" type) or each having the same refractive index (optical conductors of the "step index" type), is shown in FIGS. 3 and 4, the optical conductors 21 may have a semicircular cross-section, but other cross-sectional shapes such as rectangular, are also possible. The surface of the substrate 17 in which the optical conductors 21 are formed may be covered, if desired, with a cover layer 23 which, in order to increase the reflection of the light in the optical conductors, may be made of glass having a low refractive index (for example, the same glass as the glass of the substrate) or with a reflective metal layer such as silver. If desired, a reflective layer 25 may also be provided on the opposite surface of the substrate 17.

FIG. 2 shows diagrammatically some photoelectric elements 27 which form part of the row of such elements in the transducer 3. Each optical conductor 21 is optically coupled to one of these photoelectric elements 27.

FIG. 2 clearly shows that the width of the grooves 19 in which the optical conductors 21 are formed gradually decreases from the entrance 11 of the coupling member 7 towards the exit 13. This can also be seen from the cross-sectional views, the cross-section shown in FIG. 3 being situated near the exit 13 whilst that shown in FIG. 4 is situated near the entrance 11.

Each optical conductor 21 receives light originating from a given zone (an image point 29) on the document 1. The boundaries of the light beam which reaches the associated optical conductor 21 from an image point 29 are denoted by dotted lines 31 in FIG. 2. The image point 29 is generally slightly larger than the cross-sectional area of the light conductor 21 at the area of the entrance 11. The amount by which the image point 29 is larger depends on the distance between the entrance 11 and the document 1 and on the angle enclosed by the light beam boundaries 31 with respect to the normal to the plane of the entrance. This angle is related to the numerical aperture of the optical conductors 21 and may be, for example, 30°.

It is evident that the transducer 3 receives a larger amount of light from the scanned line on the document 1 as the image points 29 are larger. On the other hand, the resolution is lower when the adjacent image points 29 overlap one another excessively. It has been found in practice that satisfactory results can be obtained when approximately the following values are chosen for the material properties and the dimensions: refractive index of the glass of the substrate between 1.45 and 1.5 and refractive index of the glass of the optical conductors between 1.5 and 1.7 (the numerical aperture is then below 0.5); width of the optical conductors approximately 120 μm; distance between adjacent optical conductors approximately 5 μm; distance between the entrance 11 and the document between 0.1 and 1 mm. The resolution is then 8 lines per mm and for a width of 216 mm 1,728 optical conductors and photoelectric elements are then required.

The distance of 5 μm between adjacent optical conductors 21 corresponds approximately to the customary distance between adjacent photoelectric elements 27 in the transducer 3. Therefore, this distance is preferably maintained constant over the entire length of the grooves 29. The width of the photoelectric elements 27 is usually 10 μm or slightly more, so that a suitable value for the width of the groove 19 near the exit 13 is also approximately 10 μm. Thus, the width is substantially larger over the entire length of the grooves than the distance between the grooves (at least twice as large).

For the illumination of the document 1 during the scanning operation, the ambient light will not be sufficient in most cases. In such cases, a light source may be arranged in front of or behind the plane of the drawing in FIG. 1, just above the document 1. A very convenient solution, however, is to supply the light via the glass substrate 17 which is already present in the device in accordance with the invention. FIG. 5 is a side elevation of an embodiment of the device which is suitable for this purpose. The substrate 17 thereof is substantially thicker than is necessary for the depth of the grooves 19 in which the optical conductors 21 are formed. Near the transducer 3 there is arranged a linear light source 33 which extends parallel to the row of photoelectric elements 27, i.e. its longitudinal axis extends perpendicularly to the plane of the drawing in FIG. 5. Over a large part of its circumference, the light source 33 (for example, a tubular lamp) is provided with a reflective layer 35 which leaves a gap 37 only on the side facing the substrate 17, the arrangement being such that a very large part of the light emitted by the light source enters the substrate near the exit 13 of the coupling member 7 and leaves the substrate near the entrance 11. Loss of light is counteracted to high degree by the provision of said reflective layers 23 and 25 on the two principal surfaces of the substrate 17 (see FIGS. 3 and 4). When the surface 39 of the substrate 17 which faces the document 1 encloses an acute angle $\alpha$ with the plane of the optical conductors 21, the emerging light is guided better to an area directly opposite the entrance 11. If necessary, the part of the surface 39 which is remote from the light conductors 21 may also be provided with a reflective layer (not shown).

As has already been stated with reference to FIG. 1, the substrate 17 may be provided with rolling means comprising wheels 15. However, it is alternatively possible to round off the lower side of the substrate 17, so that a sliding member 41 is formed (see FIG. 6) to slide along the surface of the document 1. The distance between the entrance 11 and the document 1 is then determined by the predetermined distance through which the sliding member 41 projects beyond the ends of the optical conductors 21. The curved surface which extends between the sliding member 41 and the side of the substrate 17 which is remote from the optical conductors 21 may then form a surface corresponding to the surface 39 in FIG. 5, which encloses an acute angle with the plane of the optical conductors, said angle in this case decreasing as the distance from the plane of the optical conductors increases.

It is also possible to assemble a large number of coupling members 7 next to one another in a direction extending perpendicularly to the plane of the drawing in FIG. 1, with the entrances 11 of the coupling members 7 extending parallel to one another, so that these entrances together cover the surface of an entire document 1. Displacement of the device during the scanning of the document is not needed. When each coupling member 7 is coupled to its own transducer 3, scanning can be performed completely electrically. If desired, colour filters may be arranged between the coupling members and the transducers so that, for example, only the red light is applied to the transducers from some image points, the green light from other image points and the blue light from other image points. The colour information of the scanned document can thus also be converted into electrical signals.

What is claimed is:

1. A device for the optical scanning of a document (1), comprising a transducer (3) which comprises a row of photoelectric elements, (27) and a coupling member (7) with an entrance (11) which is to be directed towards the document and an exit (13) which is optically connected to the transducer, said coupling member (7) being constructed as an integrated optical waveguide circuit comprising a glass substrate (17) in which there are formed optical conductors (21) which extend from the entrance to the exit and the ends of which are situated on a first line at the entrance and on a second line at the exit, said first line being substantially longer than the second line, the width of each optical conductor gradually decreasing from the entrance (11) of the coupling member towards the exit (13), characterized in that in the glass substrate (17) of the coupling member (7) there are formed grooves (19) which are filled with a glass having a refractive index higher than that of the glass of the substrate, in order to form the light conductors (21) over the entire length of the grooves (19), the distance between every two adjacent grooves being substantially constant and substantially smaller than the width of the grooves.

2. A device as claimed in claim 1, characterized in that the thickness of the substrate (17) is substantially larger than the depth of the grooves (19), and near the transducer (3) there is arranged a linear light source (33) which extends parallel to the row of photoelectric elements (27) and which is so arranged with respect to the substrate that at least a part of the light emitted by the light source enters the substrate near the exit (13) of the coupling member (7) and leaves the substrate near the entrance (11) of the coupling member in order to illuminate the document (1) to be scanned.

3. A device as claimed in claim 2, characterized in that a surface (39) of the substrate (17) which faces the document (1) encloses an acute angle ($\alpha$) with the plane of the optical conductors (21).

4. A device as claimed in any one of the preceding claims, characterized in that on the substrate (17) there are provided sliding or rolling means (15, 41) which contact the document (1) during use of the device so that the entrance (11) of the coupling member (7) is situated at a predetermined distance from the document.

* * * * *